Dec. 15, 1959 W. P. FRANKENSTEIN 2,917,222

CARTON

Filed Feb. 15, 1957 7 Sheets-Sheet 1

INVENTOR.
WILLIAM P. FRANKENSTEIN

BY Joseph A. Rave
Attorney

Dec. 15, 1959 W. P. FRANKENSTEIN 2,917,222

CARTON

Filed Feb. 15, 1957 7 Sheets-Sheet 2

INVENTOR.
WILLIAM P. FRANKENSTEIN

BY Joseph A. Rave
Attorney

Dec. 15, 1959 W. P. FRANKENSTEIN 2,917,222

CARTON

Filed Feb. 15, 1957 7 Sheets-Sheet 3

INVENTOR.

WILLIAM P. FRANKENSTEIN

BY Joseph A. Rave

Attorney

INVENTOR.
WILLIAM P. FRANKENSTEIN
BY
Joseph A. Rave
Attorney

CARTON

Filed Feb. 15, 1957 7 Sheets-Sheet 5

INVENTOR.
WILLIAM P. FRANKENSTEIN
BY
Joseph A. Rave
Attorney

INVENTOR.
WILLIAM P. FRANKENSTEIN
BY
Joseph A Rave
Attorney

Dec. 15, 1959 W. P. FRANKENSTEIN 2,917,222

CARTON

Filed Feb. 15, 1957 7 Sheets-Sheet 7

INVENTOR.
WILLIAM P. FRANKENSTEIN
BY
Joseph A. Rave
Attorney

United States Patent Office 2,917,222
Patented Dec. 15, 1959

2,917,222

CARTON

William P. Frankenstein, Roselawn, Ohio

Application February 15, 1957, Serial No. 640,372

6 Claims. (Cl. 229—41)

This invention relates to improvements in cartons and particularly to cartons of the class adapted to have packed and shipped therein liquids or semi-liquids.

Cartons of the class of the present invention may be generally designated as ice cream cartons although they are not limited in use to ice cream but may contain liquid which remains in liquid state, it being understood, of course, that the stock from which the carton is made has been designed and treated to hold liquid without deteriorating.

An object of the present invention is the provision of a carton for accomplishing the purpose of containing liquid or semi-liquid and which is shipped to the user or filler in a knocked-down condition and can be readily set up either by hand or on suitable erecting machinery.

A further object of this invention is the provision of a carton wherein the bottom is formed of flaps which while glued or adhesively secured to one another in certain order are also designed to interlock to prevent inadvertent collapse.

A still further object of the present invention is the provision of a carton for accomplishing the above stated purpose which is provided with means that not only effect a stable erection of the carton but insure the same being leak-proof for containing liquids, semi-liquids and the like.

It is also an object of this invention to provide a carton for accomplishing the foregoing objects that is polygonal in cross-section and which carton is provided with means for dividing the carton into separate compartments which, in the case of ice cream, and the like, may be removed without disturbing the contents of the other compartments.

A still further object of the present invention is the provision of independent compartment forming means for use with ice cream cartons and the like so arranged that the said compartments, forming a portion of the cubical content of the carton, may be removed without disturbing the other compartments within the carton or the remaining contents of said carton.

It is also an object of this invention to provide a carton of the class hereinabove set forth which may be provided with an integral lid or cover.

A further object of this invention is the provision of a completely separable lid or cover for a carton of the present invention and an improved method of producing said separable lid or cover.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figure 1:
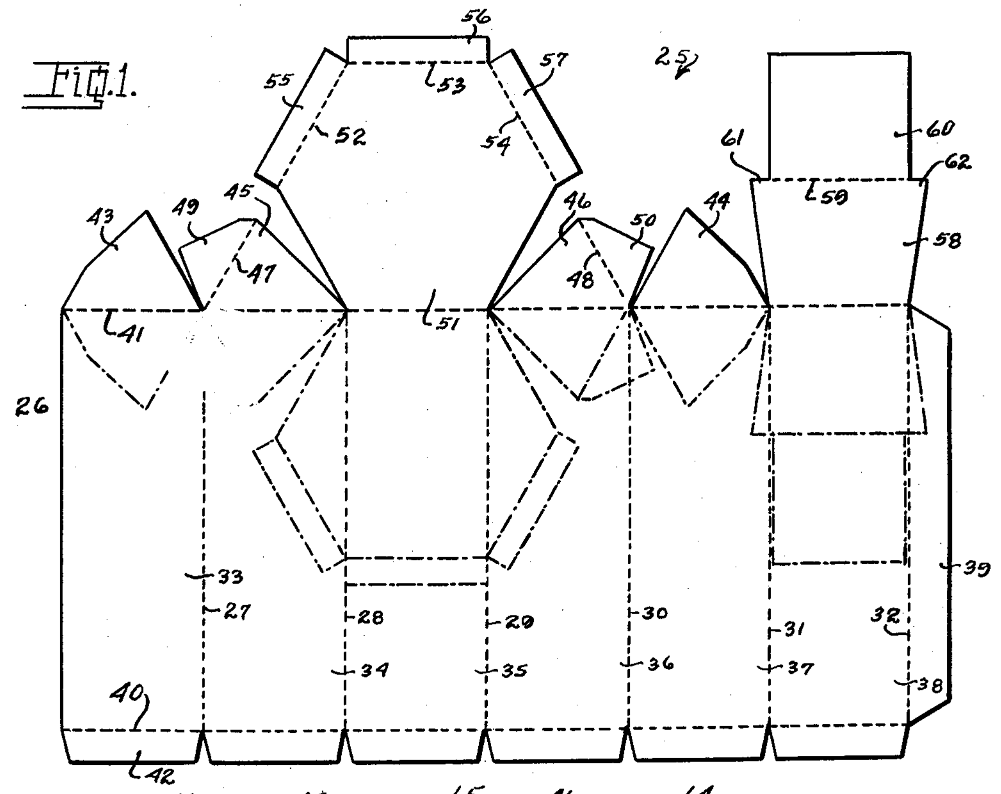
Fig. 1 is an extended plan view of a blank for producing a carton embodying the principles of the present invention.

The blank 25 as illustrated in Fig. 1 includes a substantially rectangular body portion 26 which is provided with parallel score or fold lines 27, 28, 29, 30, 31 and 32, forming between them and the lateral edges of said body portion a plurality of panels 33, 34, 35, 36, 37 and 38 which in the erected carton form the sides thereof wherefore said carton, in transverse cross-section, is polygonal, specifically, hexagonal. The score or fold line 32 integrally, hingedly, connects with the end panel 38 a flap 39 which, as will later be made clear, forms a glue flap for connecting the body portion end panels to one another.

The horizontal edges of the blank body portion 26 are defined by score or fold lines 40 and 41, the former of which forms or constitutes the upper end or top of the box or carton while the latter forms or constitutes the bottom edge of the carton.

Each of the carton upstanding walls or panels 33—38 has integrally, hingedly, connected therewith through its portion of the score or fold line 40 a flap 42, which, as will later be made clear, provides a finished upper end for the erected box or carton.

The panels 33 and 37 each have integrally, hingedly, connected with its lower end through its portion of the score or fold line 41 a similar auxiliary bottom forming flap 43 and 44 which are substantially triangular in plan. Similarly each of panels 34 and 36 has integrally, hingedly, connected with it through its portion of the score or fold line 41 an auxiliary bottom forming flap respectively indicated at 45 and 46. Flaps 45 and 46 are respectively provided with an inclined score or fold line 47 and 48 thereby providing said flaps of a substantially triangular form in plan and each of which flaps 45 and 46 through its score or fold line 47 and 48 has integrally, hingedly, therewith a glue flap 49 and 50. The carton side or body portion panel 35 through its portion of the bottom defining score or fold line 41 has integrally connected therewith the main bottom forming flap 51 which, as illustrated in the drawings, is hexagonal in plan and of an area equal to and determining the area of the erected box or carton. The outer edges of said bottom forming flap 51 is defined by score or fold lines 52, 53 and 54 through which there is integrally, hingedly, connected with said bottom forming flange 51 flaps 55, 56 and 57.

The remaining carton wall or body portion panel 38 has integrally, hingedly, connected therewith through its portion of said carton bottom defining score or fold line 41 an auxiliary bottom forming flap 58 which has its outer edge defined by a score or fold line 59 and through which there is integrally, hingedly, connected with the flap 58 a glue flap 60. The lateral edges of the outer end of the bottom forming flap 58 are extended beyond the corresponding lateral edges or sides of the glue flap 60 to provide locking or securing wings 61 and 62 laterally of the glue flap 60 and which wings are employed for interlocking the carton bottom forming parts to prevent inadvertent collapse thereof.

Figure 2:
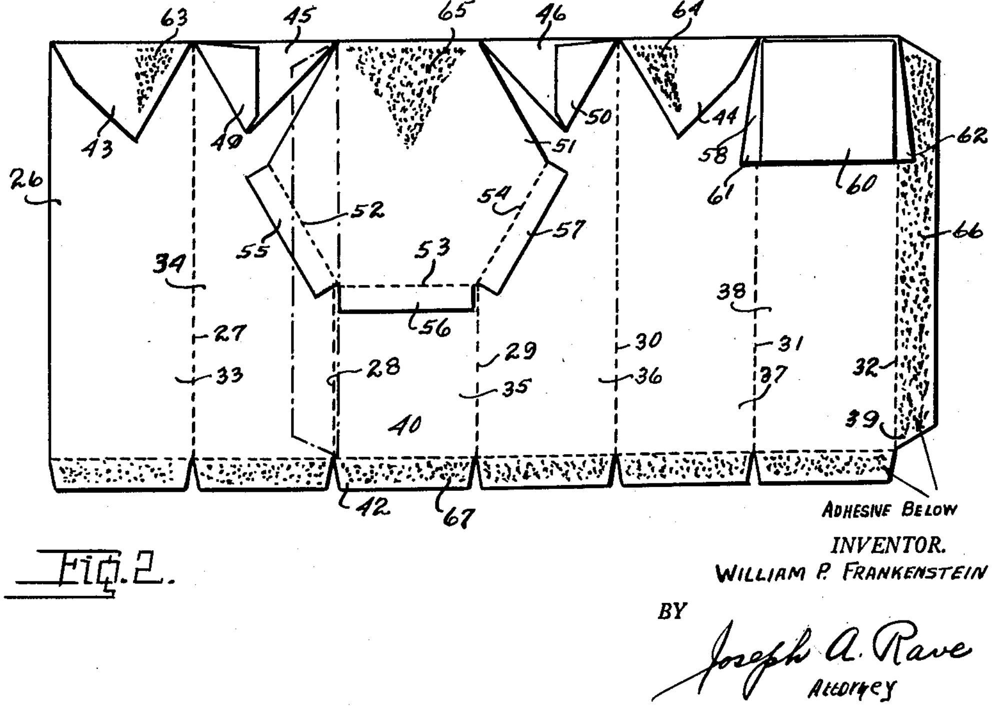
Fig. 2 is a plan view of the blank of Fig. 1 in an advanced stage of providing a knocked-down carton.

After the blank has been cut and scored as above set forth the main bottom forming flap 51 is folded to the position illustrated in phantom lines in Fig. 1 and in solid lines in Fig. 2. Similarly, each of the auxiliary bottom forming flaps 43, 45, 46, 44 and 58 are similarly folded onto their body forming panels, again as shown in phantom lines in Fig. 1 and in solid lines in Fig. 2. The glue flaps 49 and 50 are then respectively folded on the score or fold lines 47 and 48 onto the said auxiliary bottom forming flaps 45 and 46 as illustrated in solid lines in Fig. 2. At this time the glue flap 60 is folded on the score or fold line 59 to be superimposed on the auxiliary bottom forming flap 58, again, as shown in solid lines in Fig. 2.

At this time the auxiliary bottom forming flaps 43 and 44 have applied outwardly of their inner edges adhesive 63 and 64 while the exposed surface of the main bottom forming flap 51 has applied thereto adhesive 65. Simultaneously the glue flap 39 and the top reinforcing flaps 42 are respectively provided on their under surfaces, as seen in Figs. 1 and 2, with adhesive 66 and 67.

The blank is now folded to its fully knocked-down position which consists in first folding the top reinforcing flaps downwardly against the outer surface of their respective wall members or panels 33—38 for adhesively securing them in operative position whereupon the blank body 26 is folded on the score or fold line 30 for superimposing the wall members or panels 37 and 38, respectively, on the wall members or panels 36 and 35 which disposes the glue flap 39 in the position illustrated in phantom lines in Fig. 2. The body portion panel or wall member 33 is then folded on the score or fold line 27 in superimposed relation on the panel or wall member 34 and at the same time arranges the edge or free end of the panel or wall member 33 on the adhesive 66 of the glue flap 39.

The folding of the blank body member as just described brings the adhesive 64 of auxiliary bottom member flap 44 into operative engagement with the glue flap 50 of the auxiliary bottom flap 46 and at the same time brings the glue flap 60 of the auxiliary bottom flap 58 into engagement with the main bottom flap adhesive 65. The folding of the carton side or panel 33 on the score or fold line 27 in addition to connecting the free end of the carton side or panel 33 with glue flap 39 also brings the adhesive 63 of its auxiliary bottom panel 43 into operative engagement with the glue flap 49.

Figure 3:
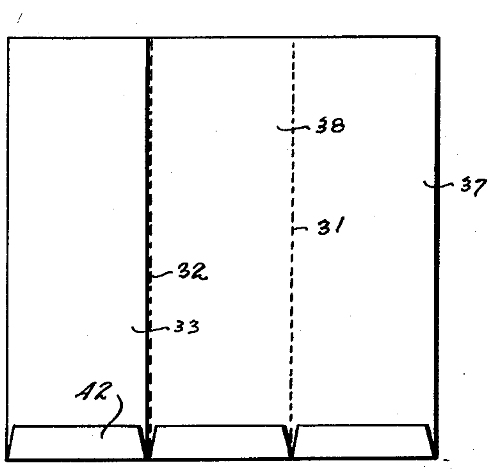
Fig. 3 is a plan view of the blank of Fig. 1 in its fully knocked-down carton position and as shipped to the user for erection and filling.

The carton blank is now in the carton knocked-down condition as illustrated in Fig. 3 and it is in this condition that the carton is shipped to the user. It is obvious that the carton, in effect, is a tube with the auxiliary bottom flaps and the main bottom flap disposed within the flattened tube at one end thereof, namely, the upper end of the Fig. 3 which in reality is the bottom end of the carton.

Figure 5:
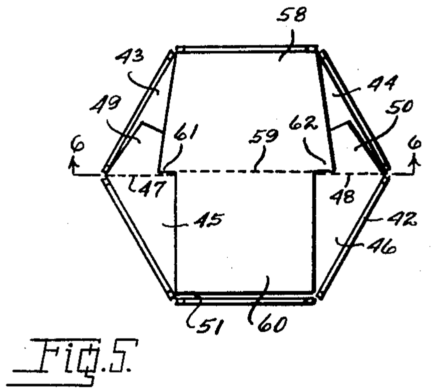
Fig. 5 is a bottom plan view of the erected carton of Fig. 4.
Figure 6:
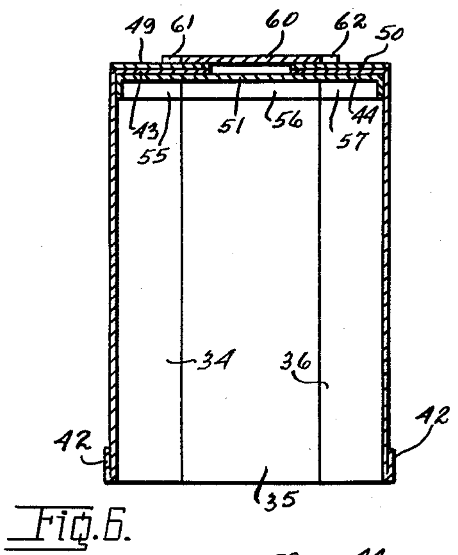
Fig. 6 is a vertical sectional view through the erected carton as seen from line 6—6 on Fig. 5.

The user in desiring to erect the carton for the purpose of filling the same does so by applying pressure to the opposite edges of the knocked-down carton as viewed in Fig. 3 thereby causing the panels or carton sides to separate from one another and at the same time causes the auxiliary and main bottom flaps to assume their operative positions transversely of the carton and result in a solid carton bottom as illustrated in plan in Fig. 5 and in transverse cross-section in Fig. 6.

Figure 7:
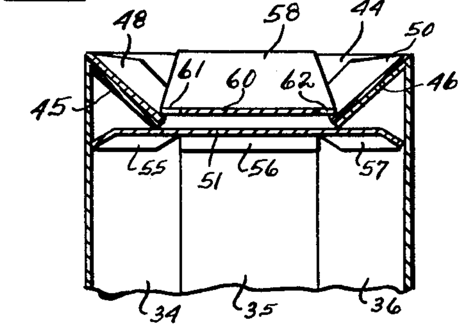
Fig. 7 is a fragmentary sectional view of a carton in the process of erection and showing the inter-connection of the bottom forming panels.

In the process of erecting the carton the various auxiliary and main bottom flaps pass from a plane parallel with the vertical axis of the knocked-down carton to a plane at right angles thereto and in the process of assuming their operative positions the said flaps pass through the stage illustrated in Fig. 7.

As illustrated in said Fig. 7 the secured auxiliary bottom flaps 43—45 and 46—54 are disposed beneath the auxiliary bottom flap 58 but above the main bottom flap 51 and upon being actuated to their operative positions, as illustrated in Fig. 7, the said auxiliary bottom flaps 43—45 and 46—54 are impinged by the locking wings 61 and 62 of the auxiliary bottom flap 58. The arrangement of the auxiliary bottom flaps and the impinging wings 61 and 62 are illustrated at the commencement of such impingement in Fig. 7 and it is obvious that as said bottom flaps are actuated to their final positions in Fig. 6 the wings 61 and 62 will be sprung to a position for interlocking the members as most clearly illustrated in Fig. 6 where it will be noted that the auxiliary bottom flap 43 and its attached glue flap 49 as well as the auxiliary bottom flap 44 and its attached glue flap 50 are located between the auxiliary bottom flap 58 and the main bottom flap 51.

This construction rigidly retains the carton bottom in operative position since any attempted collapse thereof would require the reverse springing of the auxiliary bottom flap 58 and its wings 61 and 62 to the point of releasing the other auxiliary bottom flaps 43—46 and a condition that can only be effected under force and which force must be applied interiorly of the carton against the free end of the main bottom flap 51.

The positioning of the main bottom flap 51 to its operative position automatically positions the edge flaps 55, 56 and 57 to project therefrom into the carton, as clearly illustrated in Fig. 6. The positioning of said flaps 55, 56 and 57 results in a carton which is leak-proof insofar as fluids or semi-fluids is concerned since they prevent the said fluids or semi-fluids from finding its way beneath the main bottom flap 51.

Figure 4:
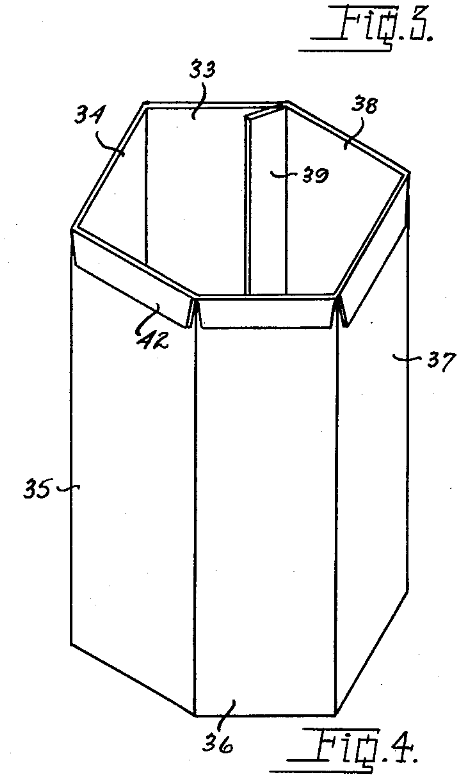
Fig. 4 is a perspective view of a set-up or erected carton from the knocked-down carton of Fig. 3.

The finally erected carton is as illustrated in Figs. 4 and 5 and it will be noted that the flaps 42 depend outwardly of the erected carton for reinforcing the said upper end of the carton walls or sides and at the same time provide a friction lock for a removable lid or cover.

The removable lid or cover is formed, in the main, in the same manner as the carton proper except that the walls or panels 33′ through 38′, corresponding to the walls 33 through 38 of the carton, are but a fraction of the height of the said latter walls and are respectively provided with flaps which are secured to one another and operate in the same manner as the bottom flaps of the carton except that the said flaps, respectively indicated by similar reference numerals provided with the (′) character, now form the main top or cover for the carton. It is of course understood that the length of the panels 33′ through 38′ are slightly wider than the panels 33 through 38 so that a slightly greater internal dimension results to permit the cover to be slipped onto the upper end of the carton. It should be noted however that this clearance takes into account the reinforcing and friction securing flaps 42 at the upper end of the carton wherefore a slight amount of pressure is required to apply the lid or cover as well as a certain amount of pull is required to remove the same. Due to the shallowness of the lid or cover walls or flanges 33′ through 38′ and to the operation of machinery folding the blank, an improved method of producing the said slip cover or lid has been provided and which results in said lid or cover being produced in pairs instead of singly.

Figures 8, 10:
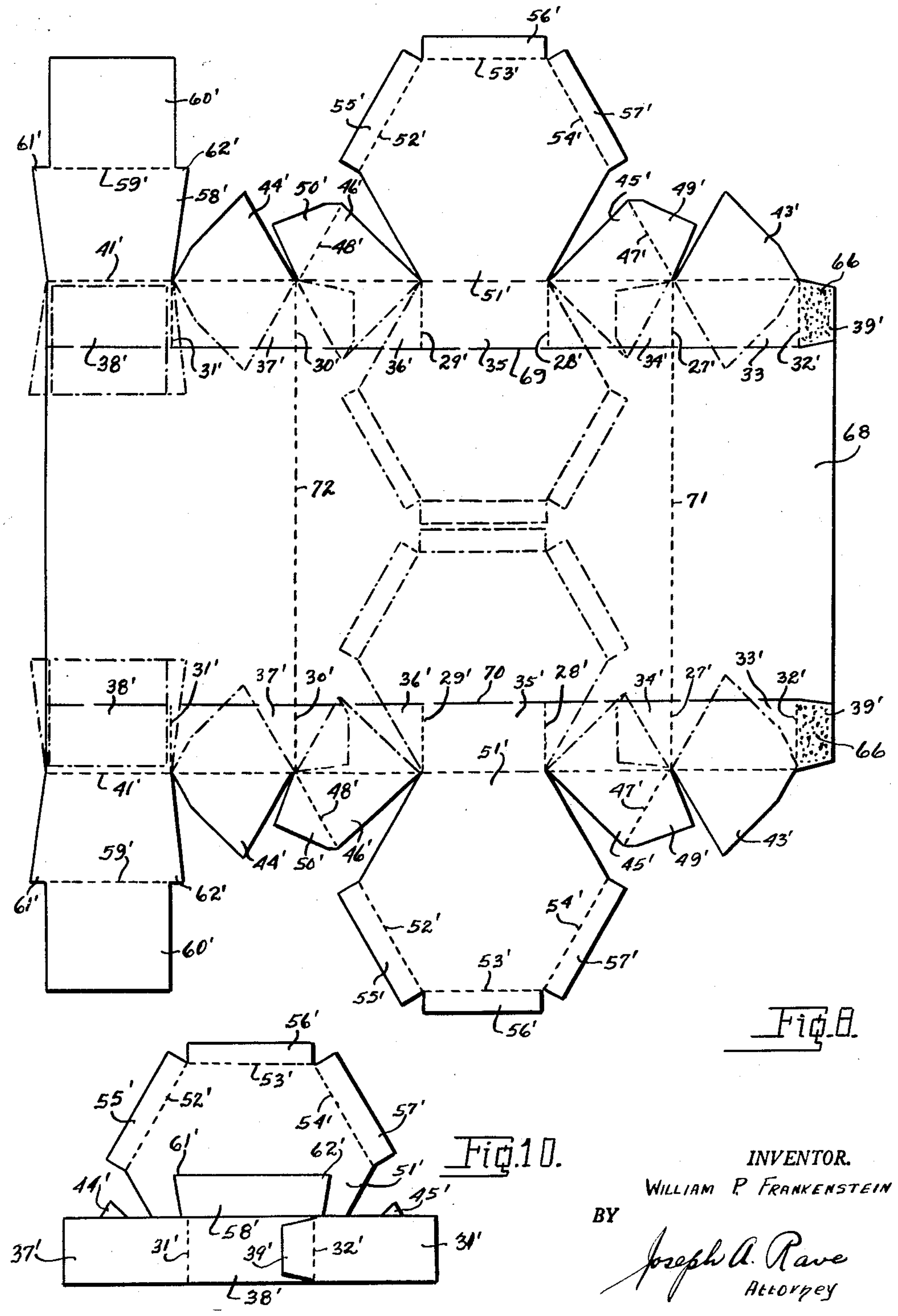
Fig. 8 is an extended plan view of a blank for producing a separable lid or cover for use with the erected carton in Fig. 4; said Fig. 8 also illustrating the method for producing the said lid or cover.
Fig. 10 is a plan view of the lid or cover blank in its knocked-down condition and as shipped to the user for erection by him.

This method, as illustrated in Fig. 8, consists in forming at the upper and lower edges of a blank body portion 68 two complete cover or lid blanks each consisting of the flanges or panels 33′ through 38′ and with each panel having integrally, hingedly, connected thereto its main or auxiliary top forming flap. The said upper and lower top or lid forming blanks are respectively connected with the body portion 68 through an interrupted cut line 69 and 70 and the said blank body portion 68 is further formed with score lines 71 and 72 parallel with the vertical or side edges of the blank body portion 68 and with said score or fold lines 71 and 72 respectively corresponding with and being continuations of the score or fold lines 27′ and 30′ of the cover or lid blanks and representing the fold lines of said lid or cover blanks and on which the blank assembly, the blank body portion 68 and the upper and lower lid or cover blanks, are folded and secured in folded positions by the upper and lower lid or cover glue flaps 39′.

The upper and lower lids or covers are now separated along the said interrupted cut lines 69 and 70 and the top forming flaps withdrawn from the overlapped portions of the blank 68 with the result that two lids or covers are provided each in a knocked-down condition, as illustrated in Fig. 10. It is in this knocked-down condition that the lids or covers are shipped to the user who erects the same in substantially the same manner as the carton is erected, namely, by applying pressure to the outer edges of the knocked-down blank causing the main and auxiliary top flaps to automatically assume their operative positions and be locked in said positions by the wings 61′ and 62′ of the auxiliary top flap 58′.

The erected lid or cover, in appearance, is substantially the same as that illustrated for the carton in Figs. 4 and 5 and is applied to the open upper end of the carton of Fig. 4 by merely slipping the same thereon.

Figure 11:
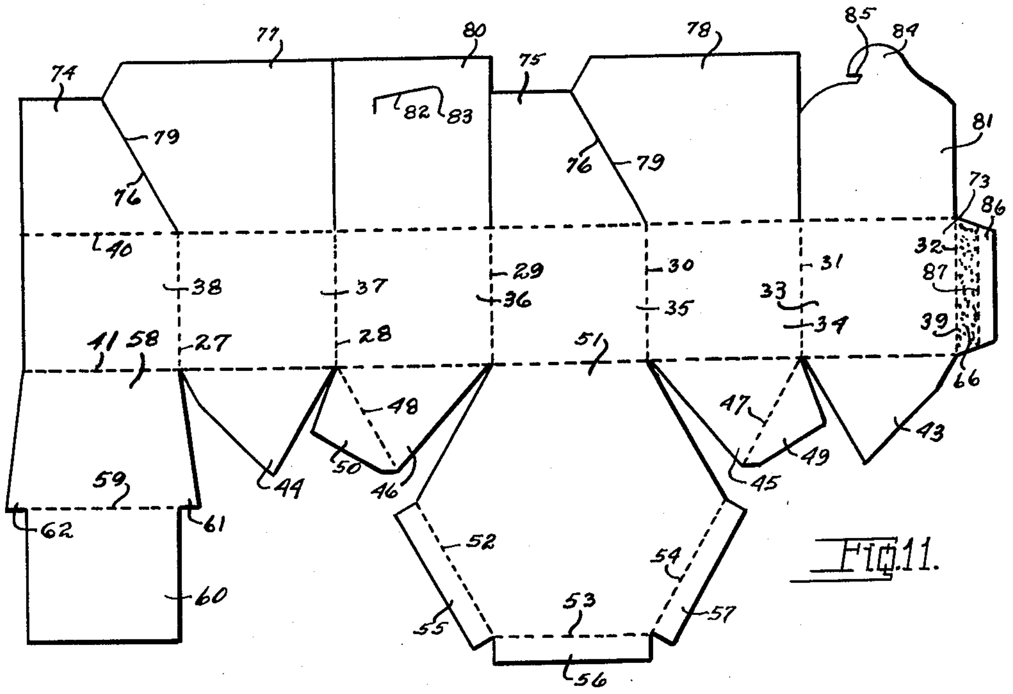
Fig. 11 is an extended plan view of a blank similar to Fig. 1 with said blank including means for supplying an integral lid or cover for the erected carton.
Figure 14:
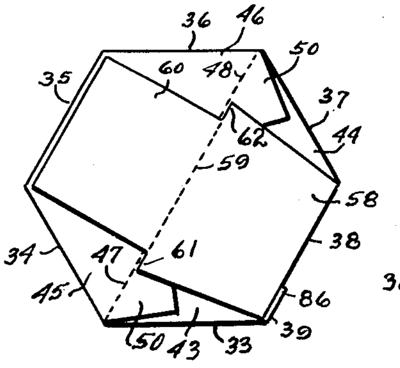
Fig. 14 is a plan view of the bottom of the erected and closed carton of Fig. 13.

The modified blank disclosed in Fig. 11 is, in the main, similar to that illustrated in Fig. 1 except that it is provided with means for forming an integral lid. The form of carton resulting from the blank of Fig. 11 differs from that from the blank of Fig. 1 in that it has greater area but less height wherefore the carton sides or blank panels would be provided with greater width and lesser height than those illustrated in Fig. 1.

Accordingly, the body portion 73 of the blank of Fig. 1 is provided with the carton sides forming panels 33—38 hingedly connected with one another through the score or fold lines 27—31. Said body portion 73 has its lower end defined by score or fold line 41 through which the main and auxiliary bottom forming flaps are integrally, hingedly, connected therewith. The upper end or edge of the said body portion 73 is defined by a score or fold line 40 which instead of merely integrally, hingedly, connecting therewith the reinforcing flanges 42 has instead connected therewith the cover forming flaps.

The said cover forming flaps are in the main formed as similarly oppositely disposed flaps for superimposed disposition with respect to one another. Accordingly the carton forming sides or blank panels 33 and 36 has each integrally, hingedly, connected therewith through its portion of the top score or fold line 40 similar flaps 74 and 75 each having a similarly inclined edge 76. The carton side forming panels 34 and 37 each has integrally, hingedly, connected therewith through its score or fold line 40 a similar covering flap 77 and 78 of an area considerably greater than the area of the flaps 74 and 75 and with each of said flaps 77 and 78 having an inclined edge 79 which is similar to the inclined edges 76 of the flaps 74 and 75. It will be appreciated that the inclined edges 76 and 79 of the cover flaps is to permit the said cover flaps to have an edge along a side of the carton which sides are at obtuse angles to one another due to the hexagonal area of the erected carton.

The remaining carton sides forming panels 35 and 38 each has integrally, hingedly, connected therewith a closing flap which cooperate in locking the closing flaps in operative positions, said closing flaps being respectively indicated by the reference numerals 80 and 81. The closing and locking flap 80 is substantially rectangular in plan and is provided downwardly of its outer free edge with a slit 82 that is L-shaped in form to provide a locking shoulder 83 for a purpose presently to be made clear. The closing and locking flap 81, similar to the flap 80, is substantially rectangular in plan and has at its outer free end a projecting tongue 84 with an inwardly projecting cut-out 85 for thereby providing a hook for cooperation with the shoulder 83 in securing the parts in their closed position.

The blank of Fig. 11 after having been cut and scored as above described as its main and auxiliary bottom flaps folded to the positions thereof illustrated in Fig. 2 for the blank of Fig. 1 and whereupon adhesive is applied to the auxiliary bottom flaps 43 and 44 as well as having the adhesive applied to the main bottom flap 51. The blank is then folded on the score or fold line 30 for superimposing the side forming panels 38 and 37 on the side forming panels 36 and 35 and at the same time operatively adhesively connecting the various glue flaps of the main and auxiliary bottom flaps carried thereby. The blank is then finally folded on the score or fold line 27 for adhesively attaching the glue flap 39 to the free end of the carton side forming panel 33 and at the same time adhesively connecting glue flap 49 and auxiliary bottom panel 43. The blank is now in its carton knocked-down condition which is substantially identical with the knocked-down carton of Fig. 3 except that the cover forming and locking flaps upwardly project from the knocked-down carton.

The glue flap 39 in the modified form of Fig. 11 is illustrated as having connected therewith a tab 86 through a score or fold line 87. The purpose of this tab is to permit the carton to be opened at its vertical connecting line so that the contents, particularly if said contents is ice cream, may be more readily accessible.

The knocked-down carton resulting from the blank of Fig. 11 is opened and erected in substantially the same manner as above set forth for the carton of Fig. 4 whereupon it may be filled and the top closed by folding the various flaps 74, 75, 77, 78, 80 and 81 into superimposed relation with one another and with the hook 85 of the tongue 84 inserted into the slit 82 for interengaging the said flaps and thereby locking all of the flaps in their closed positions as illustrated in Fig. 3. As is obvious from Fig. 13 and Fig. 12 the said closing flaps overlap one another both laterally and transversely of the carton wherefore a full and complete cover is provided with said flaps providing a substantially fluid-tight cover.

Figure 15:
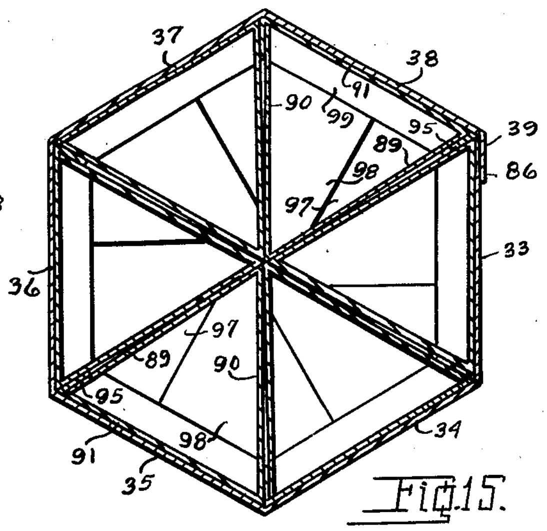
Fig. 15 is an enlarged horizontal sectional view through the closed carton of Fig. 13 and its compartment forming means as seen from line 15—15 on said Fig. 13.
Figures 12, 13, 16, 17, 18:
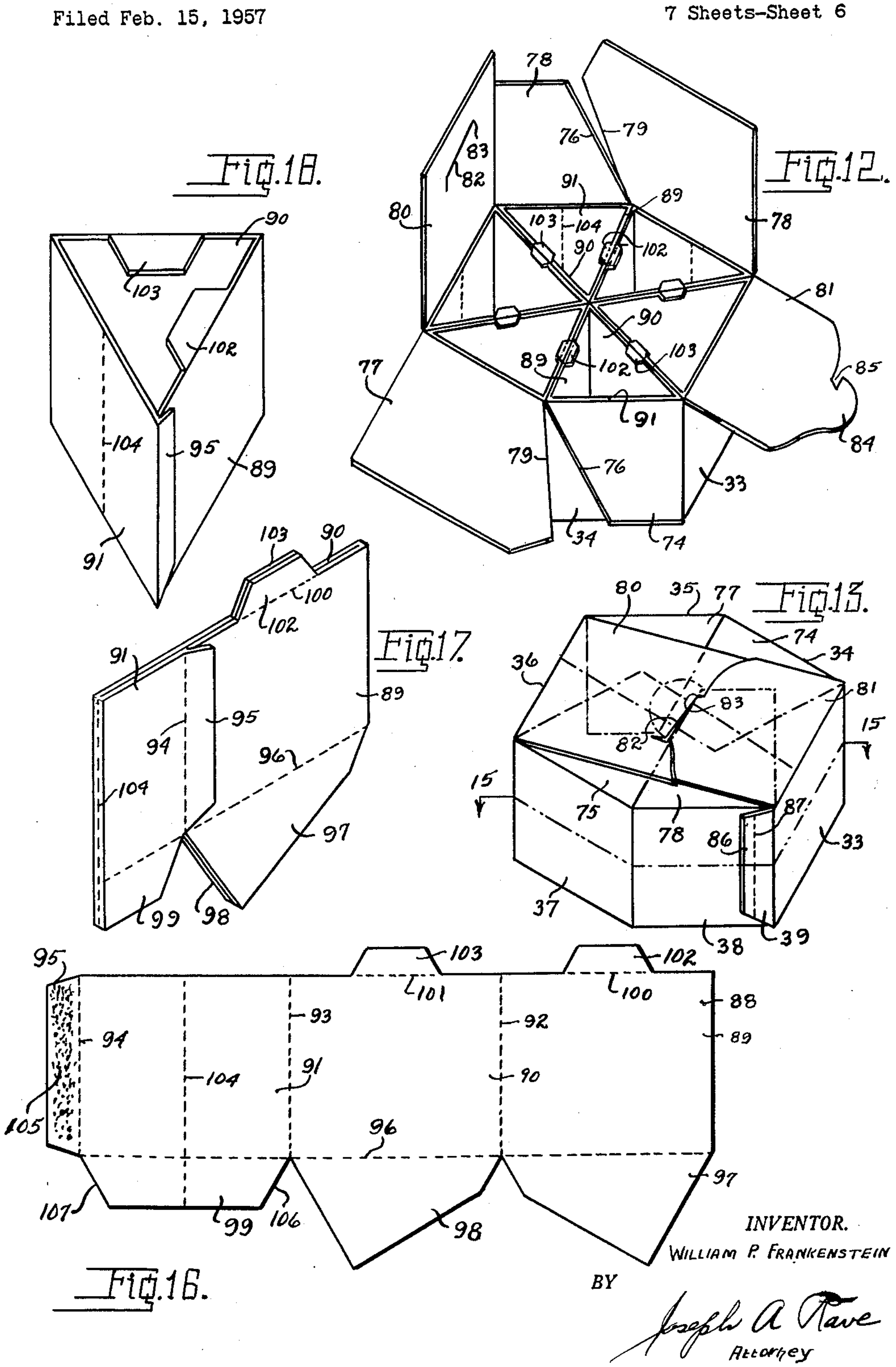
Fig. 12 is a perspective view of an erected carton from the blank of Fig. 11 showing compartment forming means therein and with the cover open.
Fig. 13 is a perspective view of a closed carton formed from the blank of Fig. 11 as seen from the top of said carton.
Fig. 16 is a plan view of a blank for forming a compartment as seen in Fig. 12.
Fig. 17 is a perspective view of the blank of Fig. 16 in its folded position for forming a knocked-down compartment and in which condition the blank of Fig. 16 is supplied to the user.
Fig. 18 is a perspective view of an erected carton compartment prior to insertion within the carton for filling while therein.

The form of carton resulting from the blank of Fig. 11 admirably lends itself to the use of compartment forming means or individual containers and which arrangement is clearly illustrated in Figs. 12 and 15. As seen in said figures the compartment containers are triangular in plan since they are utilized in the carton which is hexagonal in plan; it is to be understood that should the carton have a plan view that is other than hexagonal the compartment forming containers would have a plan view other than triangular.

The specific compartment forming containers as illustrated in Figs. 12 and 15 is formed from a blank illustrated in Fig. 16 and which blank comprises a substantially rectangular body portion 88 provided by three side forming panels 89, 90 and 91 joined to one another through the score or fold lines 92 and 93. The panel 89 has its one end defined by the cut line of the blank end while the panel 91 has its other end defined by a score or fold line 94 through the which there is integrally, hingedly, connected therewith a glue flap 95, and which glue flap in turn forms the other end of the compartment forming blank.

The lower end of the blank body 88 is defined by a score or fold line 96 while the upper end thereof, in the main, is defined by a cut line. The panels 89 and 90, respectively, through its portion of the score or fold line 96 has integrally, hingedly, connected therewith a bottom closure flap 97 and 98 each of which is substantially triangular in form and are designed to overlap each other upon being folded normal to their panels as will presently be made clear. The panel 91 through its portion of the score or fold line 96 has integrally, hingedly, connected therewith a substantially rectangular locking flap 99 having its lateral ends inclined to correspond with the angular relation of the compartment container walls with respect to one another. Each of the compartment forming container walls or panels 89 and 90 has its upper edge defined, in part, respectively, by a score or fold line 100 and 101 through which there is integrally, hingedly, connected with said panels 89 and 90 finger tabs 102 and 103. For the purpose of providing the compartment forming container in a knocked-down position the said compartment forming container wall forming panel 91 together with its locking flap 99 are provided vertically and centrally thereof with a score or fold line 104.

After the blank 88 has been cut and scored as illustrated in Fig. 16 the glue flap 95 has applied thereto adhesive 105 whereupon the blank is folded on its score or fold line 92 for superimposing the panel 89 on the panel 90. The panel 91 is then folded on its score or fold line 104 for superimposing the portions of said panel on opposite sides of said score or fold line 104 on one another and for bringing the adhesive 105 and glue flap 95 into operative engagement with the end of the blank or panel 89. The blank is now in the form of a knocked-down compartment forming container as illustrated in Fig. 7 and it is in this condition that the said compartment forming container is shipped to the user.

The user in desiring to erect the compartment forming container does so by applying pressure to the opposite edges of the knocked-down carton of Fig. 17 thereby arranging said compartment to have a triangular form in area as illustrated in Figs. 12 and 15. The locking flap 99 is then folded to be normal to its compartment forming panel 91 and have its inclined lateral edges 106 and 107 engaging the adjacent portions of the compartment forming walls 89 and 90 for retaining them in their triangular operative positions. The bottom closing flaps 97 and 98 are then folded to their bottom closing positions and with their inner edges overlapped for effecting a complete closure for the bottom.

The erected compartment forming container is now inserted in the main carton with its one wall, preferably the wall member formed by the panel 91, in face contact with one of the carton walls as formed by the blank panels 33—38. As will be noted in Figs. 12 and 15, six such compartment forming containers are placed in a carton.

In practice the user will fill each compartment whereupon the finger tabs 102 and 103 are folded inwardly of its compartment so that the cover flaps may be folded to their operative positions as above set forth. By this construction and assuming that the compartment containers, and inferentially the carton, were filled with ice cream the user may remove same in portions by simply removing a desired number of compartment containers and without in any wise disturbing any of the other compartment containers or other contents of the carton. By this construction should any compartment container be inclined to adhere to either the adjacent compartment container or the carton the same may be freed by simply passing a blade between the adjacent walls of the compartment containers or between the container walls and its adjacent carton wall.

Figures 9, 19, 20:
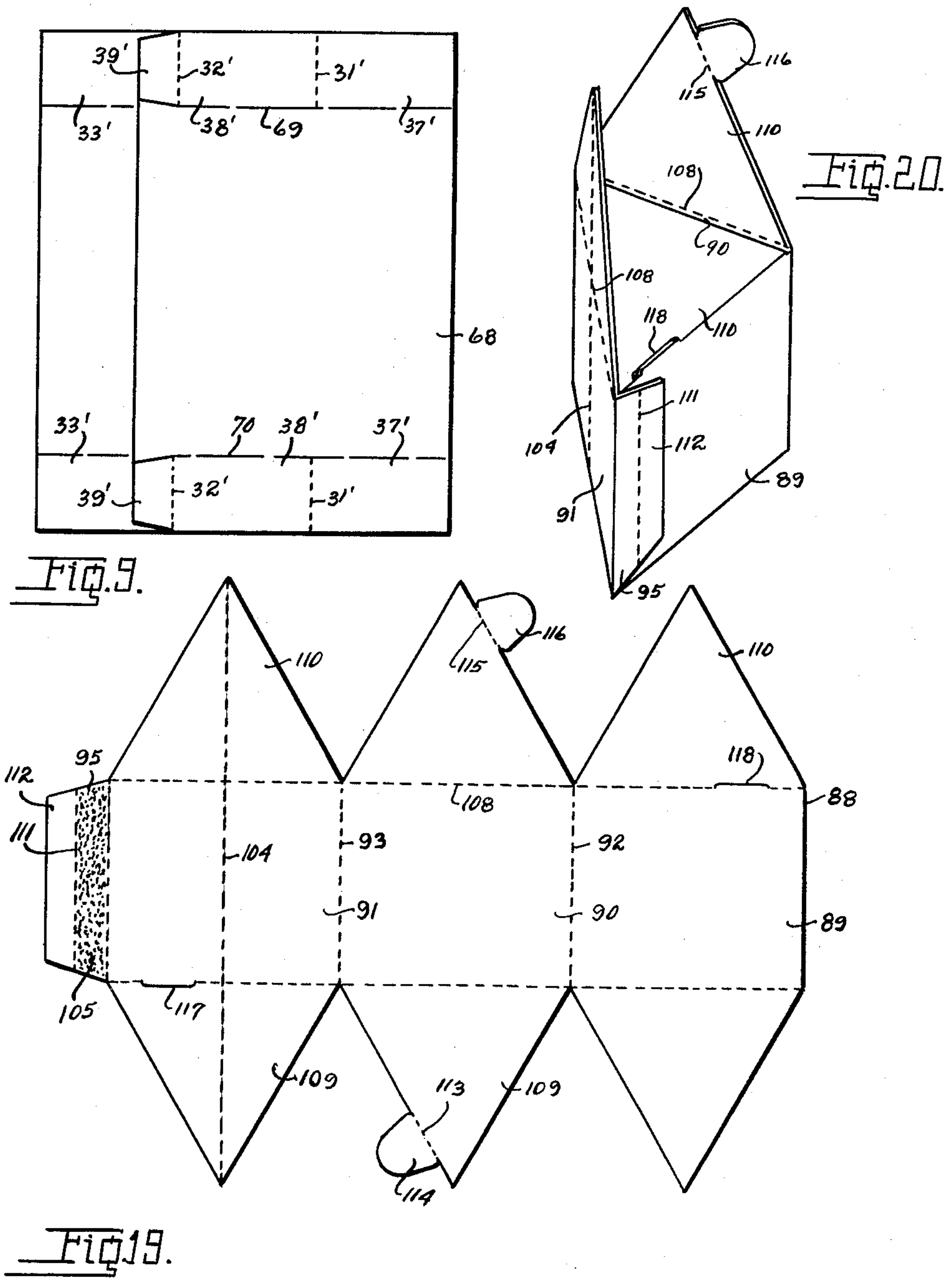
Fig. 9 is a view of the blank of Fig. 8 in its knocked-down position at the conclusion of the provision of the knocked-down blank from which the separable lid or cover is formed.
Fig. 19 is an extended plan view of a modified form of compartment enclosure.
Fig. 20 is a perspective view of an erected compartment from the blank of Fig. 19 showing the cover of the compartment partially closed and partially opened.

The modified container compartment and blank illustrated in Figs. 19 and 20 is substantially identical with that illustrated in Fig. 16 insofar as its body portion 88 is concerned and in having its lower edge defined by the score or fold line 96 but instead of having a cut line at its upper end, the said upper end is defined by a score or fold line 108. Each of the modified compartment container sides or panels 89, 90 and 91 has a similar flap integrally, hingedly, connected to its upper and lower ends through its portion of the score or fold lines 96 and 108. Each of said flaps is triangular shaped in plan and is of an area equal to the area of the compartment forming container and each is as illustrated at 109 for the lower end or bottom of a compartment forming container, and each of said flaps is as illustrated at 110 for the upper end or top of such compartment. The compartment side forming panel 91 of the form in Fig. 19, similar to the form in Fig. 16, has integrally, hingedly, connected therewith the glue flap 95 having, however, its outer edge defined by a score or fold line 111 through which there is integrally, hingedly, connected therewith a pull tab 112.

The modified compartment forming container of Fig. 19 is adapted to have its bottom closing flaps and its top closing flaps locked in their closed operative positions and for which purposes the said bottom closing flap 109 of the compartment forming container side or panel 90 has integrally, hingedly, connected therewith through score or fold line 113 a locking bag 114. Similarly the top closing flap 110 on the compartment forming container side forming panel 90 has integrally, hingedly, connected therewith, through a score or fold line 115, a locking lug 116. The bottom closing flap 109 on the panel 91 is provided along its portion of the score or fold line 96 with a slit 117 receiving the bottom locking lug 114, while, similarly, the top flap 110 of the panel 89 is provided with a slit 118 for receiving the locking lug 116.

The modified blank of Fig. 19 is folded or arranged as a knocked-down compartment forming container in the same manner as above set forth in connection with the blank of Fig. 16, namely, by first folding the blank on its score or fold line 92 and subsequently folding the blank on the score or fold line 104 medially of the panel 91 and its integrally, hingedly, attached top and bottom forming flaps 109 and 110 for operatively, adhesively, connecting the glue flap 95 with the panel 89. The blank of Fig. 19 is now in its knocked-down condition as shipped to the user.

The user in desiring to set up the modified compartment forming chamber follows the same steps as above set forth by first applying pressure to the ends of the knocked-down compartment forming chamber to open up the same whereupon the bottom end of the said compartment forming chamber is closed by first actuating the bottom flap 109 to a position normal to its panel for thereby locking the compartment forming chamber walls in their triangular positions with respect to one another and at the same time opening a slot resulting from the slit 117, whereupon the bottom closure flap of the panel 89 is folded to be normal to its panel and superimposed on the first positioned panel and finally the remaining flap is folded to its operative bottom closing position having first arranged its locking lug 114 to be normal thereto for insertion into the above mentioned slot resulting from the slit 117.

After the said compartment forming container has been filled the top closing flaps 110 are actuated in the same sequence as the bottom closing flaps and its locking lug 116 inserted into the slot resulting from the slit 118. It is to be understood that since the modified compartment forming containers are substantially liquid-tight due to the overlapped triple bottom flaps the said compartment forming containers may be filled prior to insertion in the carton or said compartment forming containers may be placed in the carton while empty and then filled while therein as above set forth for the compartment forming containers illustrated in Figs. 12 and 15.

Figure 21:
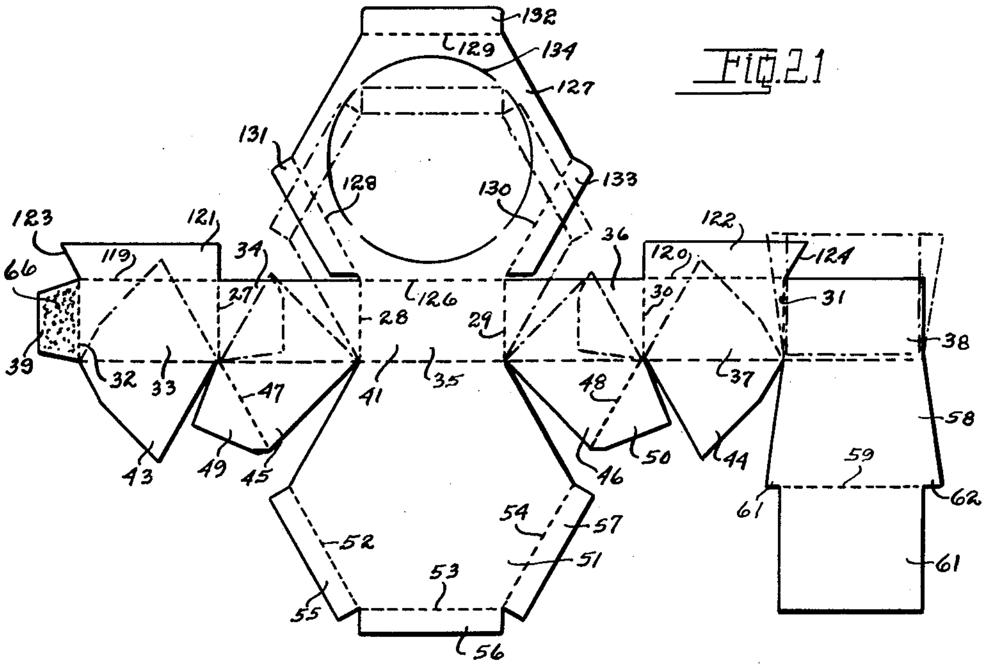
Fig. 21 is an extended plan view of a blank for forming a carton embodying the principles of the present invention and having integral therewith a lid or cover which is distinct from the lid or cover of the modification in Fig. 11.
Figure 22:
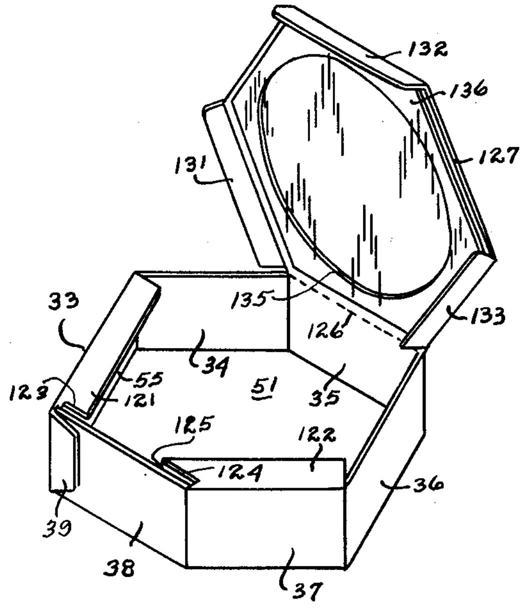
Fig. 22 is a perspective view of an erected carton from the blank of Fig. 21 with its lid or cover in an open position.
Figure 23:
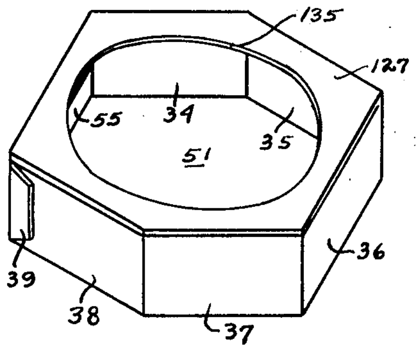
Fig. 23 is a perspective view of an erected carton from the blank of Fig. 21 but showing its lid or cover in a closed position.

The modified carton illustrated in Figs. 21, 22 and 23 is in the main similar to the blank and knocked-down carton of the separable lid as disclosed in Figs. 8 and 10 except that the flaps forming the closed upper end of the carton becomes the bottom of the carton instead of the top as in said separable cover or lid. The said modification in addition includes an integral lid of a different form from that illustrated in the blank in Fig. 11, in that in the present modification the top or cover is but a single cover flap of an area equal to the area of the box or carton within its upstanding walls.

Specifically the modified blank of Fig. 21 has the upper edges of its panels 33 and 37 defined as score or fold lines 119 and 120 through which there is integrally, hingedly, connected with said panels 33 and 37 a similar flap 121 and 122. The said flaps 121 and 122 have their outer ends upwardly and outwardly inclined as at 123 and 124 so that upon erection of the carton the said edges parallel the front wall as illustrated in Fig. 22 and afford a friction lock through resulting slots 125 for securing the cover, presently to be described, in closed position.

In the blank of Fig. 21 the panel 35 has its upper end defined by a score or fold line 126 which constitutes a hinge for the carton top 127. The carton top 127 is hexagonal in plan and of an area substantially equal to the area of the carton and is provided on selected sides thereof with score or fold lines 128, 129 and 130 through which there is integrally, hingedly, connected therewith flaps 131,, 132 and 133 which depend within the box or carton upon the closing of the cover or lid flap 127. It will be noted from the Fig. 22 that the cover flaps 131, 132 and 133 are so located as to flank the carton flaps 121 and 122 upon folding into the interior of the erected box or carton.

In the forming of the blank of Fig. 21 the cover flap 127 may be provided with an opening to permit viewing of the contents within the erected carton and in processing the said blank the said opening is formed by an interrupted cut line 134 which temporarily retains the material in the plane of the cover flap 127 until the knocked-down carton is formed.

Upon the formation of the knocked-down carton the material within the said cut line 134 is removed to provide the opening 135 of Figs. 22 and 23. If desired the said opening 135 may be covered by a sheet of transparent material 136 as illustrated in Fig. 22.

The blank of Fig. 21 after it has been cut and scored has its auxiliary bottom flaps folded to the positions thereof illustrated in phantom lines in Fig. 21 whereupon adhesive is applied to the several glue flaps of the blank as well as applying the adhesive to the main bottom forming flap whereupon the blank is folded to its knocked-down position as above set forth with respect to the blank of Fig. 1, namely, by folding the same on the score or fold line 30 and subsequently folding the blank on the score or fold line 27 for thereby adhesively attaching the glue flap 39 to the free end of the panel 38.

The user upon desiring to set up the carton follows the same steps as above outlined with respect to setting up or erecting the knocked-down blank of Fig. 1.

From the foregoing it will be noted there has been provided a carton having a polygonal form in plan which may be utilized in the presentation and packing of various materials whether dry or fluid or semi-fluid. In each instance the carton is set up from a knocked-down form by the user and the carton has a bottom which is fluid-tight to prevent loss of material whether in the form of a dry powder or in a liquid or fluid form. It will further be noted that upon erection of the carton the bottom and/or top forming main and auxiliary flaps are interlocked with one another to prevent inadvertent collapse thereby resulting in an extremely desirable carton.

What is claimed is:

1. In a carton of the class described formed from a single blank comprising a plurality of side walls each rectangular in elevation and integrally, hingedly, connected so that said carton has a hexagonal area in plan and capable of being folded flat on two opposed hinge lines of said sides and with each flat portion having a similar number of carton side walls that may be set up from said flat condition, and which hinge lines between the side walls form between them the transverse center of the carton, a main bottom flap of a configuration and area equal to the configuration and area of the erected carton and integrally, hingedly, connected to the bottom end of one of said side walls, auxiliary bottom flaps one integrally, hingedly, connected to the bottom end of each of two adjacent side walls of the carton on each side of said main bottom flap, said auxiliary bottom flaps each being substantially triangularly shaped with its base forming its hinge connection with its carton side wall and with its point extending toward but not beyond the axial center of the carton, said auxiliary flaps on each side of said main bottom flap forming a set of two bottom flaps with one flap of each set having at its edge adjacent the other an integrally, hingedly, connected glue flap adhesively secured to the other flap of its set, said hinge connection of the auxiliary bottom flaps being in line with the fold lines of the carton side walls, a final bottom flap integrally, hingedly, connected with the remaining carton side wall and of a width at least equal to the width of said carton side wall and a length to extend beyond the transverse center of the carton when erected, said final bottom flap having a transverse score line at the transverse center of the carton and with the portion of the said final bottom flap outwardly of the score line therein forming a glue flap adhesively secured to the main bottom flap, said final bottom flap laterally of its score line having projections which in the erected carton are in line with the fold line of the carton, said carton upon erection having the main bottom flap normal to the axis of the carton with said auxiliary bottom flaps beneath and coplanar with said main bottom flap, and said final bottom flap beneath and coplanar with the auxiliary bottom flaps and with said projecting portions of said final bottom flap overlying the said auxiliary bottom flaps on and to one side of the hinge line between said auxiliary bottom flaps locking said auxiliary bottom flaps between said final bottom flap projections and said main bottom flap preventing sagging and collapse of the carton bottom.

2. In a carton of the class described formed from a single blank comprising a plurality of side walls each rectangular in elevation and integrally, hingedly, connected so that said carton has a hexagonal area in plan and capable of being folded flat on two opposed hinge lines of said sides and with each flat portion having a similar number of carton side walls that may be set up from said flat condition and which hinge lines between the side walls form between them the transverse center of the carton, a main bottom flap of a configuration and area equal to the configuration and area of the erected carton and integrally, hingedly, connected to the bottom end of one of said side walls, auxiliary bottom flaps one integrally, hingedly, connected to the bottom end of each of two adjacent side walls of the carton on each side of said main bottom flap, said auxiliary bottom flaps each being substantially triangularly shaped with its base forming its hinge connection with its carton side wall and with its point extending toward but not beyond the axial center of the carton, said auxiliary flaps on each side of said main bottom flap forming a set of two bottom flaps with one flap of each set having at its edge adjacent the other an integrally hingedly, connected glue flap adhesively secured to the other flap of its set, said hinge connection of the auxiliary bottom flaps being in line with the carton transverse center and fold lines of the carton side walls, a final bottom flap integrally, hingedly, connected with the remaining carton side wall and of a width at least equal to the width of said carton side wall and a length to extend beyond the transverse center of the carton when erected, said final bottom flap having a transverse score line at the transverse center of the carton and with the portion of the said final bottom flap outwardly of the score line therein forming a glue flap adhesively secured to the main bottom flap, said final bottom flap laterally of its score line having projections which in the erected carton are in line with the fold line of the carton, said carton upon erection having the main bottom flap normal to the axis of the carton with said auxiliary bottom flaps beneath and coplanar with said main bottom flap, and said final bottom flap beneath and coplanar with the auxiliary bottom flaps and with said projecting portions of said final bottom flap overlying the said auxiliary bottom flaps on and to one side of the hinge line between said auxiliary bottom flaps locking said auxiliary bottom flaps between said final bottom flap projections and said main bottom flap preventing sagging and collapse of the carton bottom, and said main bottom flap at the edges thereof remote from its hinge connection each having integrally, hingedly, connected therewith a panel to upstand therefrom interiorly of the carton with each panel adjacent to and upwardly of the lower end of a side wall of the carton.

3. In a carton of the class described formed from a single blank comprising a plurality of side walls each rectangular in elevation and integrally, hingedly, connected so that said carton has a hexagonal area in plan and capable of being folded flat on two opposed hinge lines of said sides and with each flat portion having a similar number of carton side walls that may be set up from said flat condition and which hinge lines between the side walls form between them the transverse center of the carton, a main bottom flap of a configuration and area equal to the configuration and area of the erected carton and integrally, hingedly, connected to the bottom end of one of said side walls, auxiliary bottom flaps one integrally, hingedly, connected to the bottom end of each of two adjacent side walls of the carton on each side of said main bottom flap, said auxiliary bottom flaps each being substantially triangularly shaped with its base forming its hinge connection with its carton side wall and with its point extending toward but not beyond the axial center of the carton, said auxiliary flaps on each side of said main bottom flap forming a set of two bottom flaps with one flap of each set having at its edge adjacent the other an integrally, hingedly, connected glue flap adhesively secured to the other flap of its set, said hinge connection of the auxiliary bottom flaps being in line with the carton transverse center and fold lines of the carton side walls, a final bottom flap integrally, hingedly, connected with the remaining carton side wall and of a width at least equal to the width of said carton side wall and a length to extend beyond the transverse center of the carton when erected, said final bottom flap having a transverse score line at the transverse center of the carton and with the portion of the said final bottom flap outwardly of the score line therein forming a glue flap adhesively secured to the main bottom flap, said final bottom flap laterally of its score line having projections which in the erected carton are in line with the fold line of the carton, said carton upon erection having the main bottom flap normal to the axis of the carton with said auxiliary bottom flaps beneath and coplanar with said main bottom flap, and said final bottom flap beneath and coplanar with the auxiliary bottom flaps and with said projecting portions of said final bottom flap overlying the said auxiliary bottom flaps on and to one side of the hinge line between said auxiliary bottom flaps locking said auxiliary bottom flaps between said final bottom flap projections and said main bottom flap preventing sagging and collapse of the carton bottom, and outwardly and downwardly turned flaps at the upper end of each of the carton sides.

4. In a carton of the class described formed from a single blank comprising a plurality of side walls each rectangular in elevation and integrally, hingedly, connected so that said carton has a hexagonal area in plan and capable of being folded flat on two opposed hinge lines of said sides and with each flat portion having a similar number of carton side walls that may be set up from said flat condition and which hinge lines between the side walls form between them the transverse center of the carton, a main bottom flap of a configuration and area equal to the configuration and area of the erected carton and integrally, hingedly, connected to the bottom end of one of said side walls, auxiliary bottom flaps one integrally, hingedly, connected to the bottom end of each of two adjacent side walls of the carton on each side of said main bottom flap, said auxiliary bottom flaps each being substantially triangularly shaped with its base forming its hinge connection with its carton side wall and with its point extending toward but not beyond the axial center of the carton, said auxiliary flaps on each side of said main bottom flap forming a set of two bottom flaps with one flap of each set having at its edge adjacent the other an integrally, hingedly, connected glue flap adhesively secured to the other flap of its set, said hinge connection of the auxiliary bottom flaps being in line with the carton transverse center and fold lines of the carton side walls, a final bottom flap integrally, hingedly, connected with the remaining carton side wall and of a width at least equal to the width of said carton side wall and a length to extend beyond the transverse center of the carton when erected, said final bottom flap having a transverse score line at the transverse center of the carton and with the portion of the said final bottom flap outwardly of the score line therein forming a flue flap adhesively secured to the main bottom flap, said final bottom flap laterally of its score line having projections which in the erected carton are in line with the fold line of the carton, said carton upon erection having the main bottom flap normal to the axis of the carton with said auxiliary bottom flaps beneath and coplanar with said main bottom flap, and said final bottom flap beneath and coplanar with the auxiliary bottom flaps and with said projecting portions of said final bottom flap overlying the said auxiliary bottom flaps on and to one side of the hinge line between said auxiliary bottom flaps locking said auxiliary bottom flaps between said final bottom flap projections and said main bottom flap preventing sagging and collapse of the carton bottom, and outwardly and downwardly turned flaps at the upper end of each of the carton sides, and a slip cover or lid including a top member of an area equal to the area of the upper end of the carton including the down turned flaps thereof and a depending flange from said top member for embracing the carton down turned top flaps.

5. In combination, a carton hexagonal in area and having a bottom from the edges of which upstand sides and an open top, and a collapsible slip cover or lid formed from a single blank comprising a plurality of depending panels, one for each side of the carton, with said panels each having a length corresponding to the width of the carton side wall and hingedly connected to one another at their ends to form a ring hexagonal in area to fit the open upper end of the carton, said cover or lid ring being foldable flat on two opposed hinge lines of said depending panels with each flat portion having a similar number of depending panels that may be set up from said flat condition and which fold lines between said depending panels form between them the transverse center of the cover or lid, a main cover flap of a configuration and area corresponding to the configuration area of the cover or lid ring with said flap integrally, hingedly, connected to one of said ring panels, auxiliary cover flaps each substantially triangular in plan with the base thereof integrally, hingedly, connected to the upper end of each of two adjacent ring panels on each side of said main cover panel and with their points extending toward but not beyond the axial center of the cover or lid, said auxiliary cover flaps on each side of said main cover flap forming a set of two auxiliary cover flaps, one flap of each set of auxiliary cover flaps having a glue flap integrally, hingedly, connected with its edge adjacent the other flap and adhesively secured thereto so that said flaps of each set form a connected pair, said hinge connection of the auxiliary cover flaps being in line wtih the cover or lid transverse center and the fold lines of the depending panels, a final cover flap integrally, hingedly, connected with the remaining panel of the cover or lid panel opposite the panel to which the main cover flap is hingedly connected, said final cover flap having a length greater than one-half the distance between the opposed panels of the cover or lid with which said main cover flap and final cover flap are respectively connected and with a transverse score line therein at the transverse center of the cover or lid and with the portion of the final cover flap outwardly of the score line therein forming a glue flap adhesively secured to the main cover flap, said final cover flap having a width at its hinge connection with its panel substantially equal to the width of said panel and a width at the hinge line of its glue flap greater than its width at said panel providing outward projection in line and to the side of its said hinge line, said main cover flap upon erection of the slip cover or lid lying in a plane substantially normal to the vertical axis of the slip cover or lid, said pairs of auxiliary cover flaps upon erection of the slip cover or lid being coplanar with and above the main cover flap, and said final cover flap being coplanar with and above said pairs of auxiliary cover flaps and with the projecting portions of said final cover flap overlying the said pairs of auxiliary cover flaps on and to one side of the hinge line between said auxiliary cover flaps locking said auxiliary cover flaps between said final cover flap projecting portions and said main cover flap preventing sagging and collapse of the cover or lid.

6. In a carton of the class described formed from a single blank comprising a plurality of side walls each rectangular in elevation and integrally, hingedly, connected so that said carton has a hexagonal area in plan and capable of being folded flat on two opposed hinge lines of said sides and with each flat portion having a similar number of carton side walls that may be set up from said flat condition, and which hinge lines between the side walls form between them the transverse center of the carton, a main bottom flap of a configuration and area equal to the configuration and area of the erected carton and integrally, hingedly, connected to the bottom end of one of said side walls, auxiliary bottom flaps one integrally, hingedly, connected to the bottom end of each of two adjacent side walls of the carton on each side of said main bottom flap, said auxiliary bottom flaps each being substantially triangularly shaped with its base forming its hinge connection with its carton side wall and with its point extending toward but not beyond the axial center of the carton, said auxiliary flaps on each side of said main bottom flap forming a set of two bottom flaps with one flap of each set having at its edge adjacent the other an integrally, hingedly, connected glue flap adhesively secured to the other flap of its set, said hinge connection of the auxiliary bottom flaps being in line with the fold lines of the carton side walls, a final bottom flap integrally, hingedly, connected with the remaining carton side wall and of a width at least equal to the width of said carton side wall and a length to extend beyond the transverse center of the carton when erected, said final bottom flap having a transverse score line at the transverse center of the carton and with the portion of the said final bottom flap outwardly of the score line therein forming a glue flap adhesively secured to the main bottom flap, said final bottom flap laterally of its score line having projections which in the erected carton are in line with the fold line of the carton, said carton upon erection having the main bottom flap normal to the axis of the carton with said auxiliary bottom flaps beneath and coplanar with said main bottom flap, and said final bottom flap beneath and coplanar with the auxiliary bottom flaps and with said projecting portions of said final bottom flap overlying the said auxiliary bottom flaps on and to one side of the hinge line between said auxiliary bottom flaps locking said auxiliary bottom flaps between said final bottom flap projections and said main bottom flap preventing sagging and collapse of the carton bottom, a cover flap integrally, hingedly, connected with the upper end of each side wall and of a width at said hinge connection substantially equal to the width of its carton side wall, a first pair of two opposed of said cover flaps folded inwardly of the erected carton and each of a length to extend beyond the transverse center of the carton in overlapped relation and said flaps having their free ends of greater width than at their hinged ends wherefore the major portion of the area of the carton is covered thereby, a second pair of two opposed of said cover flaps, one adjacent each of the cover flaps of said first pair, folded inwardly of the erected carton and each of a length to stop short of the transverse center of the carton and each acting as a hold-down flap for its adjacent flap of the first pair of cover flaps, a final pair of two opposed of said cover flaps each of a width equal to the width of its side wall and of a length to extend beyond the transverse center of the carton above the inwardly folded first and second pairs of cover flaps and with the free ends of said final cover flaps overlapped, and means locking said overlapped free ends of the final pair of cover flaps.

References Cited in the file of this patent

UNITED STATES PATENTS

| | | |
|---|---|---|
| 1,758,585 | Riegel | May 13, 1930 |
| 2,020,353 | Brown | Nov. 12, 1935 |
| 2,107,946 | Inman | Feb. 8, 1938 |
| 2,165,906 | Reich | July 11, 1939 |
| 2,426,883 | Kartyshai | Sept. 2, 1947 |
| 2,517,552 | Field | Aug. 8, 1950 |
| 2,741,416 | Hileman | Apr. 10, 1956 |